US012774202B2

(12) United States Patent
Dong et al.

(10) Patent No.: US 12,774,202 B2
(45) Date of Patent: Oct. 27, 2026

(54) LIFT DEVICE AND CORRESPONDING SCISSOR LINKAGE

(71) Applicant: TEREX SOUTH DAKOTA, INC., Watertown, SD (US)

(72) Inventors: Cao Dong, Jiangsu (CN); Gu Chenyi, Jiangsu (CN); Du Rongrong, Jiangsu (CN); Yang Xiaocheng, Jiangsu (CN)

(73) Assignee: TEREX SOUTH DAKOTA, INC., Watertown, SD (US)

( * ) Notice: Subject to any disclaimer, the term of this patent is extended or adjusted under 35 U.S.C. 154(b) by 114 days.

(21) Appl. No.: 18/897,569

(22) Filed: Sep. 26, 2024

(65) Prior Publication Data

US 2026/0084947 A1 Mar. 26, 2026

(51) Int. Cl.
*B66F 11/04* (2006.01)

(52) U.S. Cl.
CPC .................................. *B66F 11/042* (2013.01)

(58) Field of Classification Search
CPC ...... B66F 11/042; B66F 7/0666; B66F 11/046
See application file for complete search history.

(56) References Cited

U.S. PATENT DOCUMENTS 4,194,723 A * 3/1980 Grove ................... B66F 11/042 254/9 C
4,712,653 A 12/1987 Franklin et al.
4,890,692 A * 1/1990 Oakman ................... B66F 3/22 187/269
5,113,972 A 5/1992 Haak, Sr.
10,322,920 B2 6/2019 Shi
10,358,330 B2 7/2019 Anglade
10,467,932 B1 * 11/2019 Kooima .................. G09F 21/04
2008/0105498 A1 5/2008 Perkins
2008/0224107 A1 * 9/2008 Polins ........................ E06B 5/01 254/45
2017/0283229 A1 * 10/2017 Shi ........................ B66F 11/042
2020/0317488 A1 10/2020 Bafile et al.
2022/0371868 A1 * 11/2022 Barlow ................. B66F 11/042
2023/0382698 A1 11/2023 Bacon et al.
2023/0406680 A1 12/2023 Varanasi et al.
2026/0054972 A1 * 2/2026 Hoover ................... B66F 9/063

FOREIGN PATENT DOCUMENTS

EP 1457381 A2 9/2004
KR 101223962 B1 1/2013
WO 0034174 A2 6/2000
WO 2023010433 A1 2/2023

* cited by examiner

*Primary Examiner* — Brian D Mattei
(74) *Attorney, Agent, or Firm* — Brooks Kushman P.C.

(57) ABSTRACT

A lift includes a base, a platform, a linkage assembly, and a stabilizing link. The linkage assembly is operable to elevate the platform relative to the base. The linkage assembly has first and second links having lower ends connected to the base and spaced-apart from each other. The linkage assembly has third and fourth links having upper ends connected to the platform and spaced-apart from each other. Center regions of the first and second links are rotatably attached to each other via a pivot, The stabilizing link has first and second ends. The first end of the stabilizing link is connected to the base adjacent to the lower end of the first link. The second end of the stabilizing link is connected to the second link.

20 Claims, 4 Drawing Sheets

LIFT DEVICE AND CORRESPONDING SCISSOR LINKAGE

TECHNICAL FIELD

The disclosure relates to a lift device including a scissor linkage.

BACKGROUND

Lift devices may include platforms that may be elevated relative to a corresponding base structure.

SUMMARY

A lift includes a base, a platform, a linkage assembly, and a stabilizing link. The linkage assembly is operable to elevate the platform relative to the base. The linkage assembly has first and second links having lower ends connected to the base and spaced-apart from each other. The linkage assembly has third and fourth links having upper ends connected to the platform and spaced-apart from each other. Center regions of the first and second links are rotatably attached to each other via a pivot. The stabilizing link has first and second ends. The first end of the stabilizing link is connected to the base adjacent to the lower end of the first link. The second end of the stabilizing link is connected to the second link. The stabilizing link is positioned such that the pivot is disposed above the stabilizing link and laterally between the first and second ends of the stabilizing link. The stabilizing link is operable to maintain alignment between the platform and base.

A scissor lift system includes a scissor linkage and a stabilizing link. The scissor linkage includes first and second links having first and second ends connected to a base. The scissor linkage includes third and fourth links having third and fourth ends connected to a platform. Center regions of the first and second links are rotatably attached to each other via a first pivot. Center regions of the third and fourth links are rotatably attached to each other via a second pivot. The first and second pivots are aligned along an axis. The first end and the third end are disposed laterally outward from the axis in a first direction. The second end and the fourth end are disposed laterally outward from the axis in a second direction opposite to the first direction. The stabilizing link has fifth and sixth ends. The fifth end is connected to the base laterally outward from the axis in the first direction. The sixth end is connected to the second link laterally outward from the axis in the second direction. The stabilizing link is operable to restrict movement of the platform relative to the base via the scissor linkage to a single direction.

A linkage system includes primary links and a secondary link. The primary links are interconnected with each other. End regions of first and second links of the primary links are configured to connect to a base. Center regions of the first and second links are rotatably attached to each other via a pivot. End regions of third and fourth links of the primary links are configured to connect to a platform such that the platform is configured to move relative to the base via the primary links. The secondary link has first and second ends. The first end of the secondary link is configured to connect to the base proximal to the end region of the first link. The secondary link extends from the end region of the first link, toward the second link, and laterally beyond the pivot such that the pivot is disposed laterally between the first and second ends of the secondary link. The second end of the secondary link is connected to the second link. The secondary link is operable to bias movement of the platform relative to the base via the plurality interconnected of links to a single direction.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
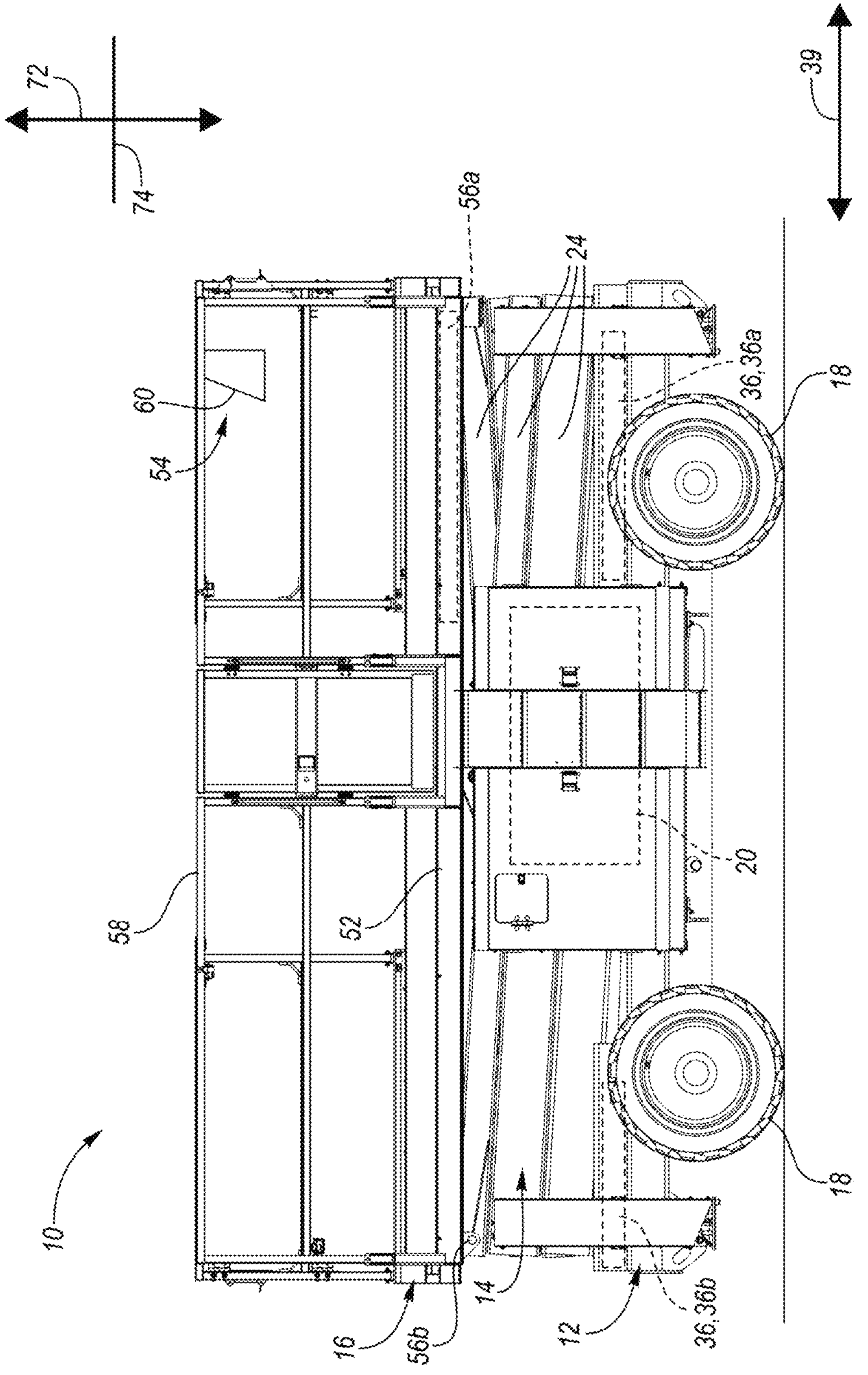
FIG. 1 is a side view of a lift device including a base, a lifting mechanism or scissor linkage coupled to the base, and a support assembly or work platform assembly coupled to an upper end of the scissor linkage, wherein the scissor linkage is shown in a stowed or retracted position.
Figure 2:
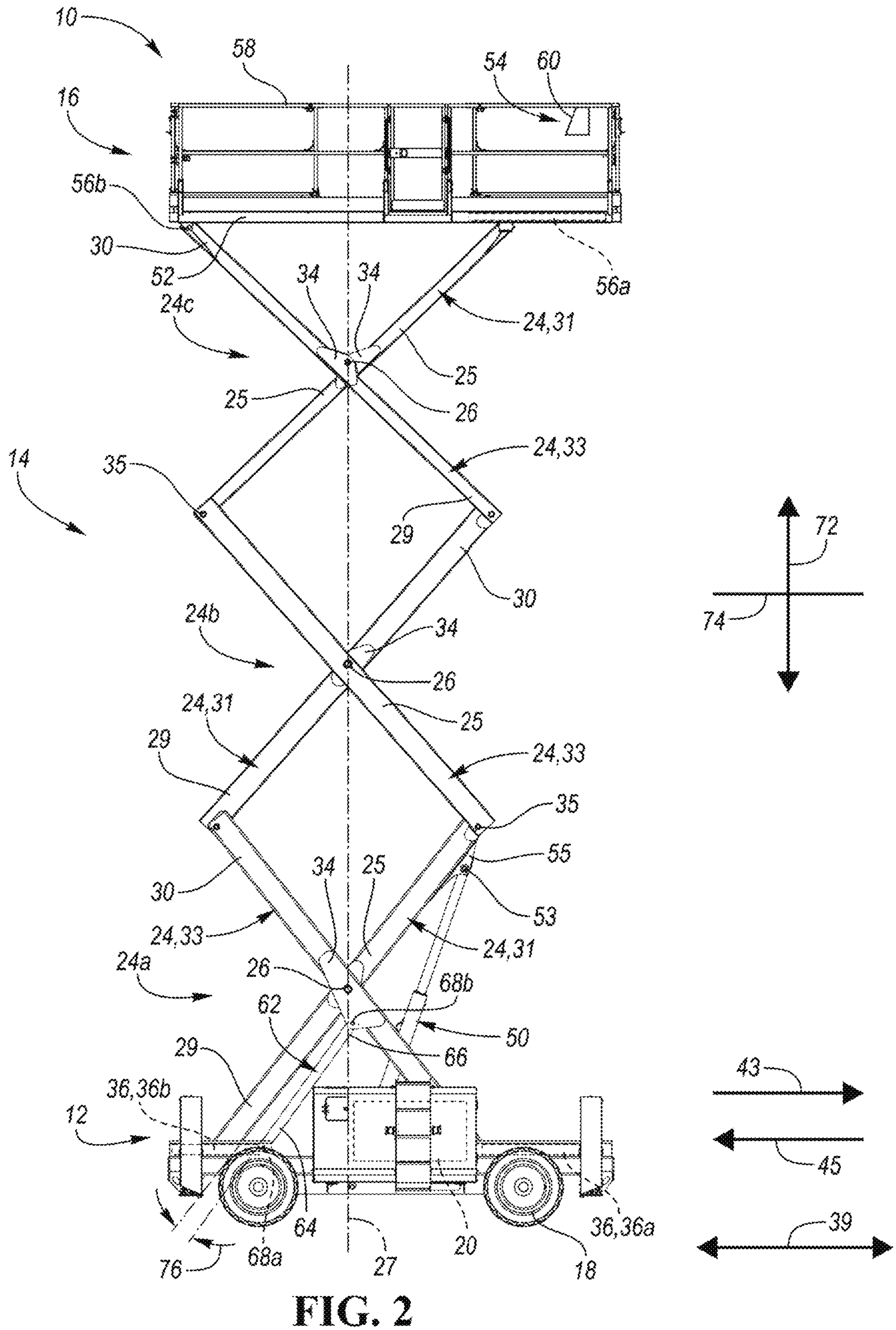
FIG. 2 is a side view of the lift device of FIG. 1 showing the scissor linkage in a deployed or extended position.
Figure 3:
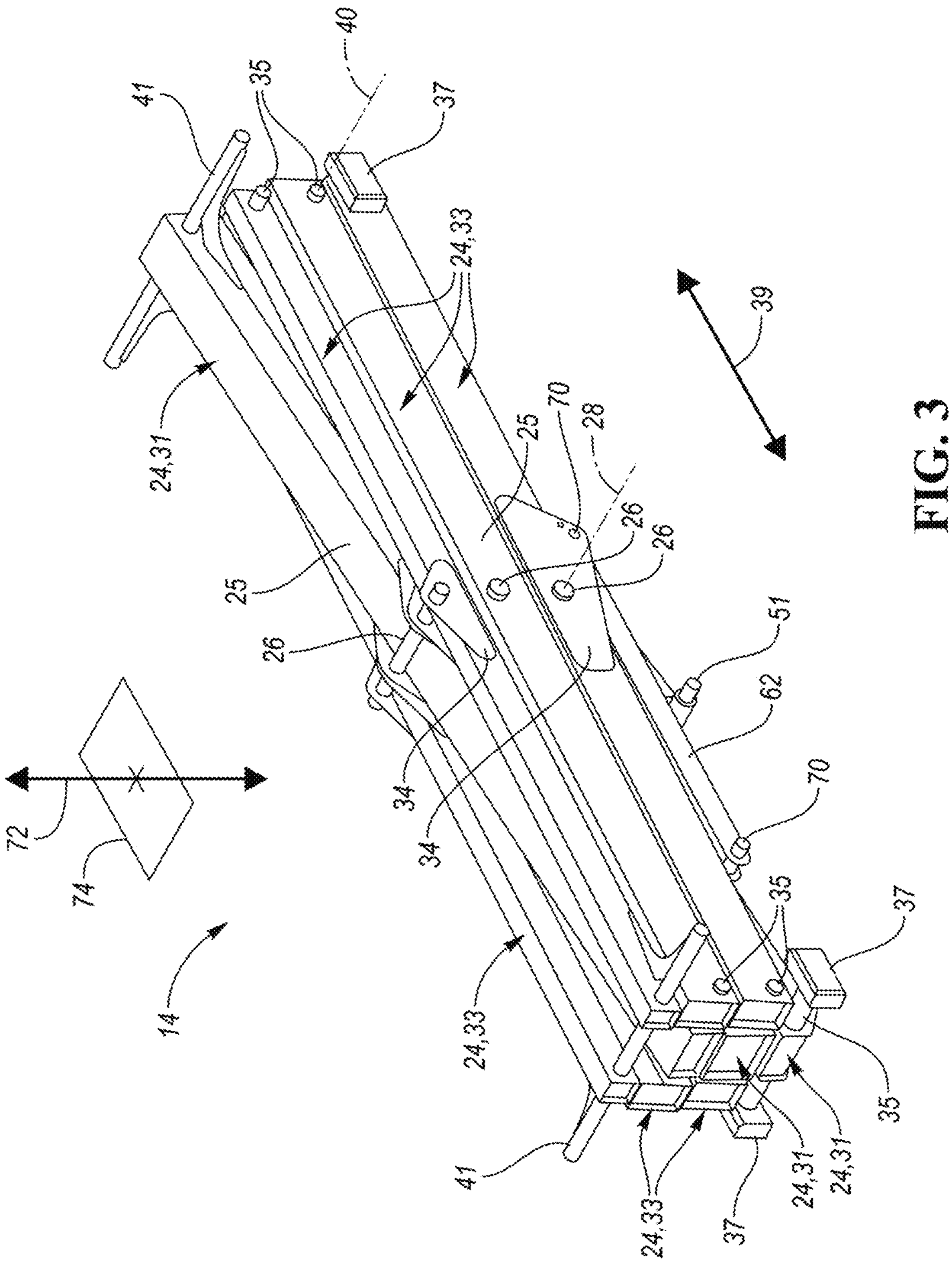
FIG. 3 is a perspective view of the scissor linkage of FIG. 1 in the stowed position.
Figure 4:
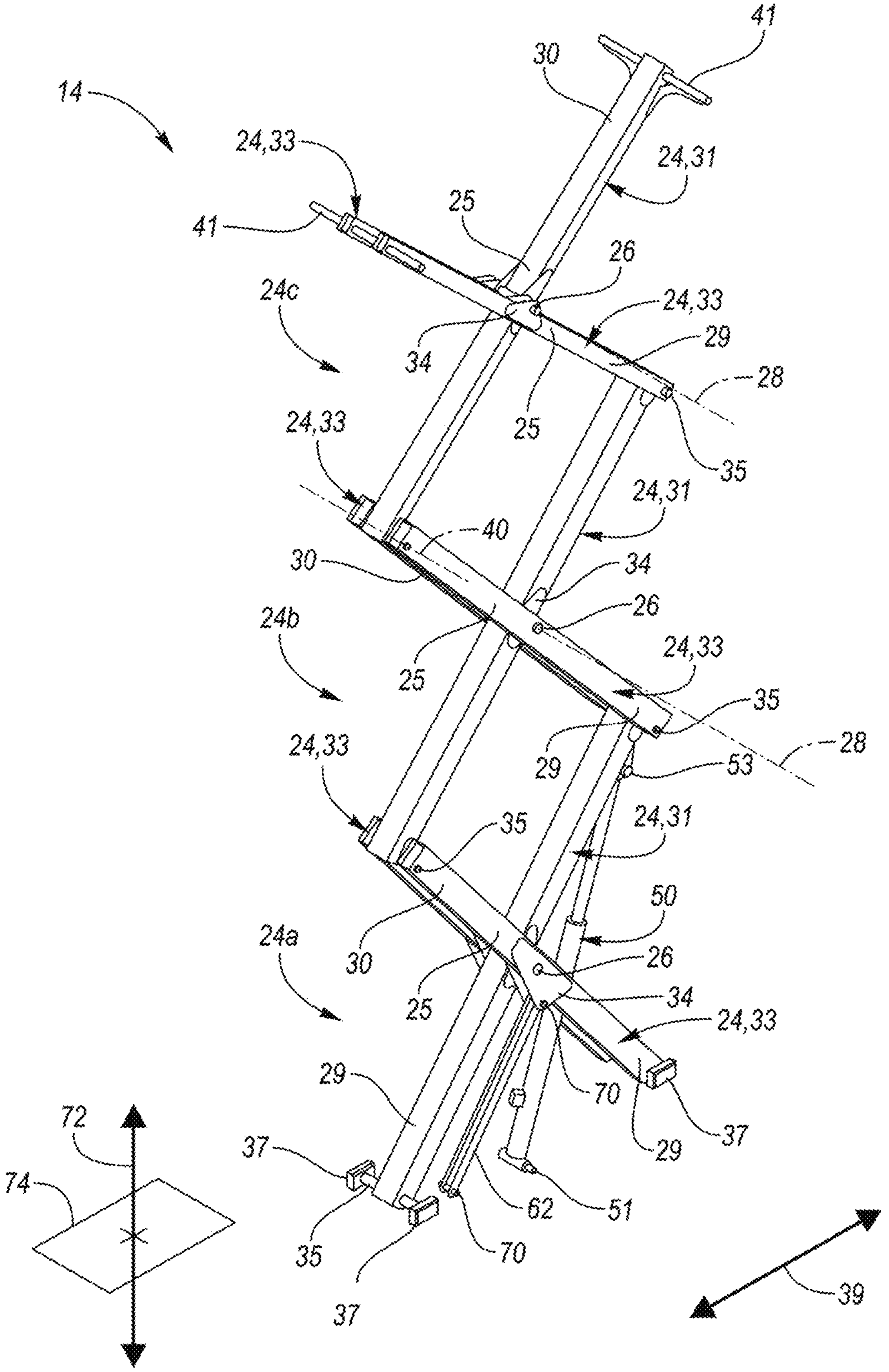
FIG. 4 is a perspective view of the scissor linkage of FIG. 1 in the deployed position.

FIGS. 1 and 2 illustrate a lift device 10, such as an aerial work platform, according to the disclosure. In the illustrated embodiment, the lift device 10 is formed as a scissor lift, having a base 12, a retractable lifting assembly, linkage assembly, scissor link system, lazy-tong linkage, or scissor linkage 14 connected to the base 12, and a support assembly, such as work platform assembly 16, connected to the scissor linkage 14. The scissor linkage 14 is movable relative to the base 12 between a stowed or retracted position, shown in FIG. 1, and a deployed or extended position, shown in FIG. 2, as well as to various positions located between the retracted position and the extended position, in order to move the work platform assembly 16 to any one of multiple desired use positions. In at least one configuration, the scissor linkage 14 is operable to elevate the work platform assembly 16 relative to the base 12.

The lift device 10 may be configured as a movable vehicle, for example. In that regard, the base 12 may be a vehicle body, frame or chassis, and the lift device 10 may be provided with one or more wheels 18, or other movement facilitating members such as tracks, movably coupled to the base 12. One or more of the wheels 18 (e.g., front wheels), or other movement facilitating members, may be driven by any suitable drive system 20, such as a combustion engine, one or more electric motors, etc., and directed by a steering system so that the lift device 10 may be positioned at a desired location. Although the drive system 20 is schematically shown in FIGS. 1 and 2 as a single unit, the drive system 20 may include any suitable number of units (e.g., engines or motors). For example, the drive system 20 may include a separate electric motor provided for each front wheel 18, or a separate electric motor may be provided for each front wheel 18 and each rear wheel 18.

In another embodiment, the lift device 10 may be a stationary device. In such a case, the base 12 may be configured as a stationary support structure, for example.

Referring to FIGS. 1-4, the scissor linkage 14 is attached to the base 12. The scissor linkage 14 may be formed of a series of multiple linked, foldable support members, linkages, or links 24, such as rigid elements or arms like tubes, bars, rods, etc., that are cooperable and/or interconnected with each other to enable the scissor linkage 14 to move between the retracted and extended positions. In the illustrated embodiment, the scissor linkage 14 includes groups or sets of such links 24. Each group or set of links 24 may include a centrally positioned link 31 that is sandwiched between two opposing laterally positioned links 33. Furthermore, the links 24 within each set of links 24 may be crisscrossed (e.g., the centrally positioned link 31 may be crisscrossed relative to the laterally positioned links 33). Intermediate or center portions or regions 25 of the links 24 within each set of links 24 may be pivotally connected together using any suitable connection, such as an intermediate pivot, a central pivot, and/or a pivot pin 26, that joins together central pivot locations along the center regions 25 so that the links 24 of within each set of links 24 are pivotable with respect to each other about a central pivot axis 28 that extends through the central pivot locations along the center regions 25. The scissor linkage 14 may any number of sets of links 24, but may more specifically include first, second and third sets of links 24*a*, 24*b*, and 24*c*, respectively, of crisscrossed support links. In another embodiment, each set may include two pairs of crisscrossed support links, or more than three pairs of crisscrossed support links. In yet another embodiment, the scissor linkage 14 may include a single set of links 24, and the set may include any suitable number of crisscrossed support links, such as one, two, three or more pairs of crisscrossed support links. The pivot pin 26, that joins together central pivot locations along the center regions 25 of each of the first, second and third sets of links 24*a*, 24*b*, and 24*c*, respectively, may be aligned along an axis 27. Axis 27 may extend vertically.

Each link 24 has first and second ends, end portions, or regions 29 and 30, respectively, on opposite sides of the center region 25 of the link 24. The end regions 29 and 30 of the links 24 may define pivot locations (e.g., end pivot location), such as an opening receiving pivot pin 35 or another connection point, that is attachable to the base 12, the work platform assembly 16, or to an end (e.g., end region 29 or end region 30) of a respective, e.g., adjacent, link 24. Some of the end regions 29 and 30 may be movably or slidably attached to the base 12 or the work platform assembly 16. In addition, pivot support structures 34 may be attached to one or more of the center regions 25, first end regions 29, or second end regions 30, such as by welding or with any suitable fasteners. Each pivot support structure 34 may include any suitable structure for pivotal attachment to the base 12, the work platform assembly 16, or to and end region (e.g., end region 29 or end region 30) of a respective, e.g., adjacent, link 24. For example, each pivot support structure 34 may include a bracket (e.g., metal or composite bracket) for receiving a pivot connector, such as a pivot pin, a roller or a slider.

Each first end region 29 forms a lower end region of the corresponding link 24 when the scissor linkage 14 is in the extended position, and each second end region 30 forms an upper end region of the corresponding link 24 when the scissor linkage 14 is in the extended position. In another embodiment, each first end region 29 may form an upper end region of the corresponding link 24 when the scissor linkage 14 is in the extended position, and each second end region 30 may form a lower end region of the corresponding link 24 when the scissor linkage 14 is in the extended position. In yet another embodiment, the links 24 of each set of links 24 may be oriented or arranged oppositely. In that regard, the first end region 29 of one link 24 of a particular set may form a lower end region when the scissor linkage 14 is in the extended position, and the first end region 29 of the other link 24 of the particular set may form an upper end region when the scissor linkage 14 is in the extended position.

The first end regions 29 of the first set of links 24*a* may be attached to the base 12. In that regard, the base 12 may include any suitable connection or articulation locations 36 for connection with the first set of links 24*a*. For example, the base 12 may include two articulation locations 36*a* (e.g., at a front end of the base 12) that are each configured to movably receive the first end region 29 of the link 24 disposed at a front side of the first set of links 24*a*, and two articulation locations 36*b* (e.g., at a rear end of the base 12) that are each configured to movably receive the first end region 29 of the link 24 disposed at a rear side of a respective first set of links 24*a*. For example, the articulation locations 36*a*, 36*b* may be formed as channels that moveably or slidably receive sliders 37, pins, or rollers attached to the first end regions 29 at the front and rear sides of the first set of links 24*a*. The first end regions 29 at the front and rear sides of the first set of links 24*a* may be slidable within the articulation locations 36 via the sliders 37 or other equivalent mechanism relative to the base 12 along direction 39. Direction 39 may correspond to a horizontal direction. The first end region 29 at the front side of the first set of links 24*a* may be disposed laterally outward from the axis 27 in a first direction 43. The first end region 29 at the rear side of the first set of links 24*a* may be disposed laterally outward from the axis 27 in a second direction 45 that is opposite to the first direction 43. The first end regions 29 of the first set of links 24*a* may be spaced-apart from each other.

The articulation locations 36 may be formed in a body portion of the base 12 or in support members, such as brackets, that are attached to the body portion. In another embodiment, all of the articulation locations on the base 12 may be configured to movably receive regions (e.g., first end regions 29) of the scissor linkage 14. The articulation locations 36*a*, 36*b* may also restrict movement of the first end regions 29 at the front and rear sides of the first set of links 24*a* to direction 39.

The second end region 30 of each link 24 of the first set of links 24*a* is pivotally attached to the first end region 29 of a respective link 24 of the second set of links 24*b* with any suitable connection, such as a pivot or pivot pin 35 (e.g., outer pivot pin). Likewise, the second end region 30 of each link 24 of the second set of links 24*b* is pivotally attached to the first end region 29 of a respective link 24 of the third set of links 24*c* with any suitable connection, such as a pivot or pivot pin 35 (e.g., outer pivot pin). For each of the first and second sets of links 24*a*, 24*b*, each second end region 30 may be attached to the first end region 29 of a respective link 24 at the pivot location (e.g., opening receiving pivot pin 35 or another connection point) of the respective link 24 so that the connected links are each pivotable about a pivot axis 40 (e.g., end pivot axis) that extends through the pivot location of the respective link 24.

The second end region 30 of each link 24 of the third set of links 24*c* is attached to the work platform assembly 16. For example, each of the second end regions 30 of each link 24 of the third set of links 24*c* may be movably attached to the work platform assembly 16 in any suitable manner (e.g., pivotably or slidably). The links 24 may also be connected together using any suitable connection, such as pivot pins, bars, braces, or laterally extending rods 41.

The lift device 10 may include one or more actuators, such as hydraulic cylinders, pneumatic cylinders, electric linear actuators, etc., associated with the scissor linkage 14 and configured to move the scissor linkage 14 from the retracted position to the extended position or between the retracted position and the extended position. The lift device 10 includes an actuator 50 mounted to the base 12 and to one or more of the links 24. Specifically, the actuator 50 has a first end connected to the base 12 (e.g., a first end of the actuator 50 is connected to a laterally extending member or link 51, such as a pivot pin, rod, bar or brace, that is in turn connected to the base) and a second end connected to one of the links 24 of the first set of links 24*a* (e.g., a second end of the actuator 50 is connected to a laterally extending member or link 53, such as a pivot pin rod, bar or brace, that is in turn connected to one of the links 24 of the first set of links 24*a*). More specifically, the second end of the actuator 50 may be connected to the centrally positioned link 31 of the first set of links 24*a* via a pivot structure 55, which may comprise a bracket or one or more plates that are a suitable structure for pivotal attachment. Furthermore, the actuator 50 is movable between a retracted position and an extended position for moving the scissor linkage 14 from the retracted position to the extended position.

In another embodiment, the lift device 10 may include one or more actuators connected between two or more sets of the links 24 (e.g., the first of links 24*a*, the second set of links 24*b*, or the third set of links 24*c*). In yet another embodiment, the lift device 10 may include any combination of the above-described actuators. For example, the lift device 10 may include one or more actuators connected between the base 12 and one or more of the links 24, and/or one or more actuators mounted to different links 24. In any case, the one or more actuators for moving the scissor linkage 14 may be considered part of the scissor linkage 14.

The work platform assembly 16 is coupled to the scissor linkage 14 and includes a support member, such as base or work platform 52, and a control system 54 associated with the platform 52 for controlling operation of the lift device 10 (e.g., operation of the drive system 20, operation of the steering system, movement of the platform 52 via the scissor linkage 14, and/or movement of the platform 52 with respect to the scissor linkage 14).

The work platform 52 is movable with respect to the base 12 between a lowered position, shown in FIG. 1, and a raised position, shown in FIG. 2, when the scissor linkage 14 is moved between the retracted and extended positions, respectively. While the work platform assembly 16 may be coupled to the scissor linkage 14 in any suitable manner, in the illustrated embodiment, the second end regions 30 of the links 24 disposed at a front side and at a rear side of the respective third set of links 24*c* may be attached to the work platform assembly 16. More specifically, the work platform 52 includes one or more connection or articulation locations 56*a* (e.g., at a front end of a base of the platform 52) that are configured to movably receive the second end region 30 of the link 24 disposed at the front side of a respective third set of links 24*c*, and one or more connection or articulation locations 56*b* (e.g., at a rear end of the platform 52) that are configured to movably receive the second end region 30 of the link 24 disposed at the rear side the respective third set of links 24*c*. For example, the articulation locations 56*a* may be formed as channels that slidably receive sliders, pins, bars, or rollers attached to the second end regions 30 (e.g., laterally extending rods 41) at the front side of the third set of links 24*c*, while the articulation locations 56*b* may be fixed pivot points (e.g., an orifice defined in the work platform assembly 16, in a bracket extending from the work platform assembly 16, or in a plate extending from the work platform assembly 16 that pivotably receives the laterally extending rods 41) at the rear side of the third set of links 24*c*. The second end region 30 at the front side of the third set of links 24*c* may be disposed laterally outward from the axis 27 in the first direction 43. The second end region 30 at the rear side of the third set of links 24*c* may be disposed laterally outward from the axis 27 in the second direction 45.

The articulation locations 56*a* may facilitate movement between the link 24 disposed at the front of side the respective third set of links 24*c* and the work platform assembly 16 along direction 39, while the articulation locations 56*b* my facilitate rotation between the link 24 disposed at the rear side the respective third set of links 24*c* and the work platform assembly 16. The second end regions 30 of the third set of links 24*c* may be spaced-apart from each other. The articulation locations 56*a* may also restrict movement between the link 24 disposed at the front of side the respective third set of links 24*c* and the work platform assembly 16 to only direction 39. The articulation locations 56*b* may also restrict movement between the link 24 disposed at the rear side the respective third set of links 24*c* and the work platform assembly 16 to only rotation between the link 24 disposed at the rear side the respective third set of links 24*c* and the work platform assembly 16. The second end regions 30 of the third set of links 24*c* may be spaced-apart from each other.

The platform 52 of the work platform assembly 16 is sized to receive an operator thereon. A railing assembly or frame assembly 58 is provided on the platform 52, and the frame assembly 58 includes one or more guard members or rails (e.g., toe-boards, middle rails, and top rails) that cooperate to contain the operator within the frame assembly 58. The frame assembly 58 may also include a movable (e.g., pivotable) door to allow an operator ingress to, and egress from, the work platform assembly 16.

The control system 54 may include any suitable controls for controlling operation of the lift device 10. For example, the control system 54 may include a control unit 60 (e.g., electronic control unit, control box or control panel) mounted on or supported by the platform 52 and having one or more controls, such as buttons, switches, wheels, levers (e.g., joysticks), etc., for inputting control commands. The control system 54 may also include one or more other control units positioned at other locations on the lift device 10. Furthermore, the control system 54 may include any suitable hardware and/or software for controlling operation of any of the above-described systems, mechanisms, arrangements or other components. For example, the control system 54 may include one or more processors in communication with, or configured to communicate with, one or more storage devices or memory units, which include computer readable program instructions that are executable by the one or more processors so that the control system 54 may control operation of the scissor linkage 14, the drive system 20, the steering system, etc. The control system 54 may also, or instead, include one or more application specific integrated circuits, programmable gate arrays, programmable logic devices, and/or digital signal processors.

While illustrated as a single controller, the control system 54 may be part of a larger control system and may be controlled by various other controllers throughout the lift device 10. It should therefore be understood that the control system 54 and one or more other controllers can collectively be referred to as a "controller" that controls various actuators in response to signals from various sensors to control functions of the lift device 10. The control system 54 may include a microprocessor or central processing unit (CPU) in communication with various types of computer readable storage devices or media (e.g., a non-transitory computer readable medium having instructions stored thereon). Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the control system 54 in controlling the lift device 10.

Control logic or functions performed by the control system 54 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the lift device 10 or its subsystems. The computer-readable storage devices or media may include one or more of a number of known physical devices which utilize electric, magnetic, and/or optical storage to keep executable instructions and associated calibration information, operating variables, and the like.

The lift device 10 further includes a stabilizing link 62. The stabilizing link 62 has first and second ends, end portions, or end regions 64 and 66. The first end region 64 may be a lower region of the stabilizing link 62 while the second end region 66 may be an upper region of the stabilizing link 62, or vice versa. The scissor linkage 14 and the stabilizing link 62 may collectively be referred to as a linkage system. The links 24 of the scissor linkage 14 may be referred to as primary links while the stabilizing link 62 may be referred to as a secondary link. The first end region 64 of the stabilizing link 62 is connected to the base 12 along one or more articulation locations 68*a*. The second end region 66 of the stabilizing link 62 is connected to one of the links 24 of the third set of links 24*c* (the link 24 along the front side of the third set of links 24*c*) along one or more articulation locations 68*b*. More specifically, the second end region 66 of the stabilizing link 62 may be connected the center region 25 of the corresponding link 24 of the third set of links 24*c*. Even more specifically, the second end region 66 of the stabilizing link 62 may be connected to one or more pivot support structures 34 that are attached to the center region 25 of the corresponding link 24 such that the second end region 66 of the stabilizing link 62 may be slightly offset from the corresponding link 24 of the third set of links 24*c*.

The articulation locations 68*a* and 68*b* may be pivots, such as fixed pivot points (e.g., orifices defined in the base 12 and the corresponding link 24 of the third set of links 24*c* that pivotably receive the pivot pins, bars, braces, or laterally extending rods 70 that are connected to each of the end regions 64 and 66 of the stabilizing link). Such orifices that receive the pivot pins, bars, braces, or laterally extending rods 70 may more specifically be defined in brackets or plates that are secured to the base 12 and/or to the corresponding link 24 of the third set of links 24*c* (e.g., the orifices may be defined by the one or more pivot support structures 34).

The articulation locations 68*a* may facilitate movement between the stabilizing link 62 and the base 12, while the articulation locations 68*b* my facilitate movement between the stabilizing link 62 and the corresponding link 24 of the third set of links 24*c*. The articulation locations 68*c* may also restrict movement between the stabilizing link 62 and the base 12 to only rotation between the stabilizing link 62 and the base 12. The articulation locations 68*b* may also restrict movement between the stabilizing link 62 and the corresponding link 24 of the third set of links 24*c* to only rotation between the between the stabilizing link 62 and the corresponding link 24 of the third set of links 24*c*.

The first end region 64 of the stabilizing link 62 may be connected to the base 12 at articulation locations 68*a* adjacent and/or proximal to the first end region 29 of the link 24 disposed at the rear side of the first set of links 24*a* (e.g., adjacent and/or proximal to articulation locations 36*b*). The second end region 66 of the stabilizing link 62 may be connected to the links 24 disposed at the front side of the third set of links 24*c* at articulation locations 68*b*. Alternatively, the first end region 64 of the stabilizing link 62 may connected to the base 12 at articulation locations 68*a* adjacent and/or proximal to the first end region 29 of the link 24 disposed at a front side of a respective first set of links 24*a* (e.g., adjacent and/or proximal to articulation locations 36*a*) while the second end region 66 of the stabilizing link 62 is connected to the link 24 disposed at the rear side of the third set of links 24*c* at articulation locations 68*b*.

The stabilizing link 62 extends from the position on the base 12 that is adjacent and/or proximal to the first end region 29 of the link 24 disposed at the rear side of the respective first set of links 24*a*, toward the link 24 disposed at the front side of the respective first set of links 24*a*, and laterally beyond the pivot or pivot pin 26 joining the center regions 25 of the links 24 forming the first set of links 24*a*, such that the pivot pin 26 is disposed laterally between the end regions 64 and 66 of the stabilizing link 62. Stated in other terms, the stabilizing link 62 is positioned such that the pivot pin 26 joining the center regions 25 of the links 24 forming the first set of links 24*a* is disposed above the stabilizing link 62 and laterally between the end regions 64 and 66 of the stabilizing link 62. It is noted that all of the pivot pins 26 (e.g., the pivot pins of each of the set of links 24*a*, 24*b*, and 24*c*) may be disposed above the stabilizing link 62 and laterally between the end regions 64 and 66 of the stabilizing link 62. Therefore, at least a portion of the first end region 64 of the stabilizing link 62 may be disposed laterally outward from the axis 27 in the second direction 45, while at least a portion of the second end region 66 of the stabilizing link 62 may be disposed laterally outward from the axis 27 in the first direction 43.

The stabilizing link 62; the connections of the stabilizing link 62 to the base 12 and to the scissor linkage 14 (e.g., connections at articulation locations 68*a* and 68*b*); and/or the connections of the scissor linkage 14 to the base and to the work platform assembly 16 (e.g., connections at articulation locations 36*a*, 36*b*, 56*a*, and 56*b*) are operable to maintain alignment between the work platform assembly 16 and the base 12. More specifically, the stabilizing link 62 and/or the connections at the articulation locations are operable to restrict, limit, or bias movement of the work platform assembly 16 relative to the base 12 via the scissor linkage 14 to a single direction 72. The single direction 72 may be a horizontal direction. The stabilizing link 62 and/or the connections at the articulation locations may more specifically be operable to restrict or limit movement of the work platform assembly 16 along a horizonal plane 74 (e.g., a plane that is perpendicular to direction 72).

The stabilizing link 62 may be offset from the link 24 disposed at the rear side of the first set of links 24*a* by an angle 76 that ranges between 0° and 10°. The stabilizing link 62 may alternatively be substantially parallel to the link 24 disposed at the rear side of the first set of links 24*a*. As used herein, substantially parallel refers to any incremental angle that is between exactly parallel and 15° or less from exactly parallel (e.g., 12.5° or less from exactly parallel, 10° or less from exactly parallel, 5° or less from exactly parallel, 1° or less from exactly parallel, 0.5° or less from exactly parallel, 0.1° or less from exactly parallel, etc.).

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A lift comprising:

a base;

a platform;

a linkage assembly operable to elevate the platform relative to the base, the linkage assembly having (i) first and second links having lower ends connected to the base and spaced-apart from each other and (ii) third and fourth links having upper ends connected to the platform and spaced-apart from each other, wherein center regions of the first and second links are rotatably attached to each other via a pivot; and a stabilizing link having first and second ends, wherein (i) the first end of the stabilizing link is connected to the base adjacent to the lower end of the first link, (ii) the second end of the stabilizing link is connected to the second link, (iii) the stabilizing link is positioned such that the pivot is disposed above the stabilizing link and laterally between the first and second ends of the stabilizing link, and (iv) the stabilizing link is operable to maintain alignment between the platform and base.

2. The lift of claim 1, wherein the second end of the stabilizing link is rotatably connected to the second link via a second pivot.

3. The lift of claim 2, wherein the lower ends of the first and second links are slidably connected to the base.

4. The lift of claim 3, wherein the upper ends of the third and fourth links are rotatably connected to the platform via a third pivot and slidably connected to the platform, respectively.

5. The lift of claim 4, wherein the first end of the stabilizing link is connected to the base via a fourth pivot.

6. The lift of claim 1, wherein the stabilizing link is operable to restrict movement of the platform relative to the base via the linkage assembly to a single direction.

7. The lift of claim 6, wherein the single direction is a vertical direction and the stabilizing link is operable to restrict movement of the platform relative to the base along a horizontal plane.

8. A scissor lift system comprising:

a scissor linkage including first and second links having first and second ends connected to a base, and including third and fourth links having third and fourth ends connected to a platform, wherein (i) center regions of the first and second links are rotatably attached to each other via a first pivot, (ii) center regions of the third and fourth links are rotatably attached to each other via a second pivot, (iii) the first and second pivots are aligned along an axis, (iv) the first end and the third end are disposed laterally outward from the axis in a first direction, (v) the second end and the fourth end are disposed laterally outward from the axis in a second direction opposite to the first direction; and a stabilizing link having fifth and sixth ends, wherein (i) the fifth end is connected to the base laterally outward from the axis in the first direction, (ii) the sixth end is connected to the second link laterally outward from the axis in the second direction, and (iii) the stabilizing link is operable to restrict movement of the platform relative to the base via the scissor linkage to a single direction.

9. The scissor lift system of claim 8, wherein the sixth end is rotatably connected to the second link via a third pivot.

10. The scissor lift system of claim 9, wherein the first and second ends are slidably connected to the base.

11. The scissor lift system of claim 10, wherein the third and fourth ends are rotatably connected to the platform via a fourth pivot and slidably connected to the platform, respectively.

12. The scissor lift system of claim 11, wherein the fifth end is connected to the base via a fifth pivot.

13. A linkage system comprising:

primary links interconnected with each other, wherein (i) end regions of first and second links of the primary links are configured to connect to a base, (ii) center regions of the first and second links are rotatably attached to each other via a pivot, and (iii) end regions of third and fourth links of the primary links are configured to connect to a platform such that the platform is configured to move relative to the base via the primary links; and a secondary link having first and second ends, wherein (i) the first end of the secondary link is configured to connect to the base proximal to the end region of the first link, (ii) the secondary link extends from the end region of the first link, toward the second link, and laterally beyond the pivot such that the pivot is disposed laterally between the first and second ends of the secondary link, (iii) the second end of the secondary link is connected to the second link, and (iv) the secondary link is operable to bias movement of the platform relative to the base via the primary links to a single direction.

14. The linkage system of claim 13, wherein the second end of the secondary link is rotatably connected to the second link via a second pivot.

15. The linkage system of claim 14, wherein the second pivot is attached to the center region of the second link.

16. The linkage system of claim 14, wherein the end regions of the first and second links are configured to slidably connect to the base.

17. The linkage system of claim 16, wherein the end regions of the third and fourth links are configured to rotatably connect to the platform via a third pivot and slidably connect to the platform, respectively.

18. The linkage system of claim 17, wherein the first end of the secondary link is configured to connect to the base via a fourth pivot.

19. The linkage system of claim 18, wherein the single direction is a vertical direction and the secondary link is operable to restrict movement of the platform relative to the base along a horizontal plane.

20. The linkage system of claim 13, wherein the secondary link is offset from the first link at an angle that ranges between 0° and 10°.

* * * * *